United States Patent
Frolikov

(10) Patent No.: US 11,347,429 B2
(45) Date of Patent: *May 31, 2022

(54) LIVE FIRMWARE ACTIVATION IN A MEMORY SYSTEM

(71) Applicant: Micron Technology, Inc., Boise, ID (US)

(72) Inventor: Alex Frolikov, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 109 days.

This patent is subject to a terminal disclaimer.

(21) Appl. No.: 16/827,576

(22) Filed: Mar. 23, 2020

(65) Prior Publication Data

US 2020/0225869 A1    Jul. 16, 2020

Related U.S. Application Data

(63) Continuation of application No. 16/119,473, filed on Aug. 31, 2018, now Pat. No. 10,635,345.

(51) Int. Cl.
   *G06F 9/4401*    (2018.01)
   *G06F 3/06*    (2006.01)
   *G06F 8/61*    (2018.01)

(52) U.S. Cl.
   CPC .......... *G06F 3/0655* (2013.01); *G06F 3/0607* (2013.01); *G06F 3/0673* (2013.01); *G06F 8/61* (2013.01); *G06F 9/4401* (2013.01)

(58) Field of Classification Search
   CPC .... G06F 3/0655; G06F 3/0607; G06F 3/0673; G06F 8/61; G06F 9/4401

USPC ........................................................ 711/154
See application file for complete search history.

(56) References Cited

U.S. PATENT DOCUMENTS

| | | | |
|---|---|---|---|
| 7,099,967 B2 | 8/2006 | Farkas et al. | |
| 7,103,687 B2 | 9/2006 | Farkas et al. | |
| 8,051,415 B2 | 11/2011 | Suzuki | |
| 8,745,614 B2 | 6/2014 | Banerjee et al. | |
| 10,635,345 B2 * | 4/2020 | Frolikov | G06F 9/4403 |
| 2006/0212633 A1 | 9/2006 | Kasper | |
| 2007/0260775 A1 | 11/2007 | Bita et al. | |
| 2008/0184020 A1 | 7/2008 | Gee et al. | |
| 2010/0180051 A1 | 7/2010 | Harris | |
| 2012/0159137 A1 | 6/2012 | Khosravi et al. | |
| 2012/0209939 A1 | 8/2012 | Ito et al. | |
| 2012/0210046 A1 | 8/2012 | Ito et al. | |
| 2013/0285943 A1 | 10/2013 | Kuo et al. | |
| 2016/0098344 A1 | 4/2016 | Gorobets et al. | |
| 2017/0032126 A1 | 2/2017 | Koike et al. | |
| 2018/0004504 A1 | 1/2018 | Stenfort et al. | |

(Continued)

*Primary Examiner* — Christopher B Shin
(74) *Attorney, Agent, or Firm* — Greenberg Traurig

(57) ABSTRACT

A memory system having memory components and a processing device to: communicate with a host system to obtain, from the host system, at least one host specified parameter during booting up of the host system; execute first firmware to process requests from the host system using the at least one host specified parameter, the requests including storing data into the memory components and retrieving data from the memory components; install second firmware while running the first firmware; store the at least one host specified parameter; and reboot into executing the second firmware using the at least one host specified parameter, without rebooting of the host system.

20 Claims, 6 Drawing Sheets

(56) References Cited

U.S. PATENT DOCUMENTS

2020/0073580 A1 3/2020 Frolikov
2020/0225869 A1* 7/2020 Frolikov ............... G06F 3/0655

* cited by examiner

LIVE FIRMWARE ACTIVATION IN A MEMORY SYSTEM

RELATED APPLICATION

The present application is a continuation application of U.S. patent application Ser. No. 16/119,473, filed Aug. 31, 2018 and entitled "Live Firmware Activation in a Memory System", the entire disclosure of which application is hereby incorporated herein by reference.

FIELD OF THE TECHNOLOGY

At least some embodiments disclosed herein relate to memory systems in general, and more particularly, but not limited to live firmware activation in a memory system.

BACKGROUND

A memory sub-system can be a memory module, such as a dual in-line memory module (DIMM), a small outline DIMM (SO-DIMM), or a non-volatile dual in-line memory module (NVDIMM). A memory sub-system can be a storage system, such as a solid-state drive (SSD), or a hard disk drive (HDD). A memory sub-system can include one or more memory components that store data. The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

Operations of some memory sub-systems are controlled at least in part via firmware. The firmware of a memory sub-system can be updated to improve the operations of the memory sub-system.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
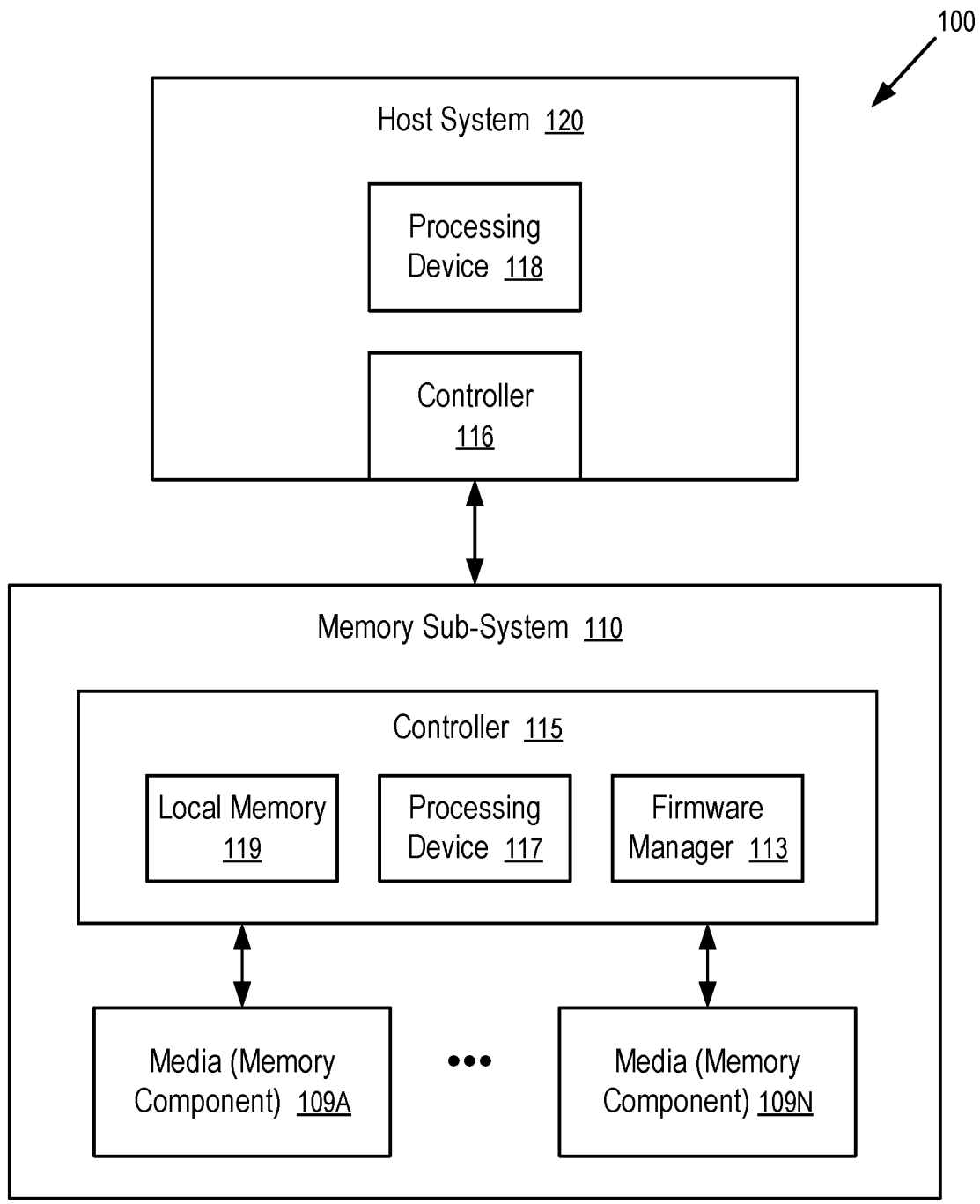
FIG. 1 illustrates an example computing system having a memory sub-system in accordance with some embodiments of the present disclosure.

At least some aspects of the present disclosure are directed to the live activation of updated firmware of a memory sub-system without requiring the host system to reconfigure the operations of the memory sub-system. A memory sub-system is also hereinafter referred to as a "memory device". An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory sub-system is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

A conventional memory sub-system can be configured to work with a host system using a set of parameters. The parameters are typically obtained by the conventional memory sub-system from the host system during a boot process. For example, a memory sub-system can be connected to a host system via an NVM (non-volatile memory) Express (NVMe) interface. During the boot process, the memory sub-system obtains from the host system a set of parameters (e.g., the content of NVMe Controller Registers). The parameters configure the operations of the memory sub-system. For example, NVMe controller registers can include base address registers (BAR), NVMe admin and I/O queues, Message Signaled Interrupts (MSI) interrupt vectors, etc. The NVMe controller registers identify the resources in the host system that can be used by the memory sub-system in communications with the host system. After updated firmware is installed for use, it is typical that the host system is rebooted to allow the memory sub-system running the updated firmware to obtain the set of parameters through the booting process. However, rebooting the host system can significant impact the availability and/or usability of the host system.

At least some aspects of the present disclosure address the above and other deficiencies by providing the memory sub-system with the capability to boot up in two different modes. When the memory sub-system boots up in a normal mode, the memory sub-system communicates with the host system to obtain the parameters (e.g., the content of NVMe Controller Registers). For example, in response to the host system rebooting or restarting, the memory sub-system boots up in the normal mode. After the memory sub-system boots up, the memory sub-system stores a copy of the parameters in a non-volatile memory, which allows the memory sub-system to restart or reboot without communicating with the host system to obtain the parameters. When the sub-system boots up in a restart mode, the memory sub-system reads the parameters from the non-volatile memory and skips the communications with the host system that are designed to obtain the parameters during the rebooting or restarting of the host system. Thus, when new/updated firmware is ready for use, the memory sub-system can perform an internal reset and boot up in the restart mode using the new/updated firmware, without requiring the host system to engage in communications designed for the specification of the parameters and thus avoiding restarting or rebooting of the host system. Thus, the techniques reduce the impact of firmware update on the availability and/or usability of the host system.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative-and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 109A to 109N.

The computing system 100 includes a firmware manager 113 in the memory sub-system 110 that can manage firmware update and activation with reduced impact on the host system 120. In some embodiments, the processing device 117 in the memory sub-system 110 includes at least a portion of the firmware manager 113. For example, the controller 115 and/or the processing device 117 can include logic circuitry implementing the firmware manager 113. For example, the processing device 117 (processor) of the memory sub-system 110 can be configured to execute instructions stored in memory for performing the operations of the firmware manager 113 described herein. In some embodiments, the firmware manager 113 is part of the firmware of the memory sub-system 110, an operating system of the host system 120, a device driver, or an application.

The firmware manager 113 can perform live firmware update and activation in the memory sub-system 110 without requiring the host system 120 to restart, reset or reboot. When the memory sub-system 110 is operating using existing firmware, the firmware manager 113 can store updated firmware in the memory components 109A to 109N. Further, the firmware manager 113 can store a copy of the parameters, obtained by the memory sub-system 110 running the existing firmware from the host system 120, in a memory of the memory sub-system 110. For example, the parameters can be stored in the local memory 119, or in a memory component 109A or 109N, where the parameters are not erased when the memory sub-system 110 restarts to run the updated firmware, without the host system 120 also restarting/rebooting. To switch live from using the existing firmware to using the updated firmware without restarting/rebooting the host system 120, the firmware manager 113 causes the memory sub-system to boot in a restart mode in which the parameters retrieved from the memory of the memory sub-system 110 is used directly, without communicating with the host system 120 to re-obtain the parameters. Thus, the firmware of the memory sub-system 110 can be updated, activated, and used with reduced impact on the host system 120. Further details with regards to the operations of the firmware manager 113 are described below.

Figure 2:
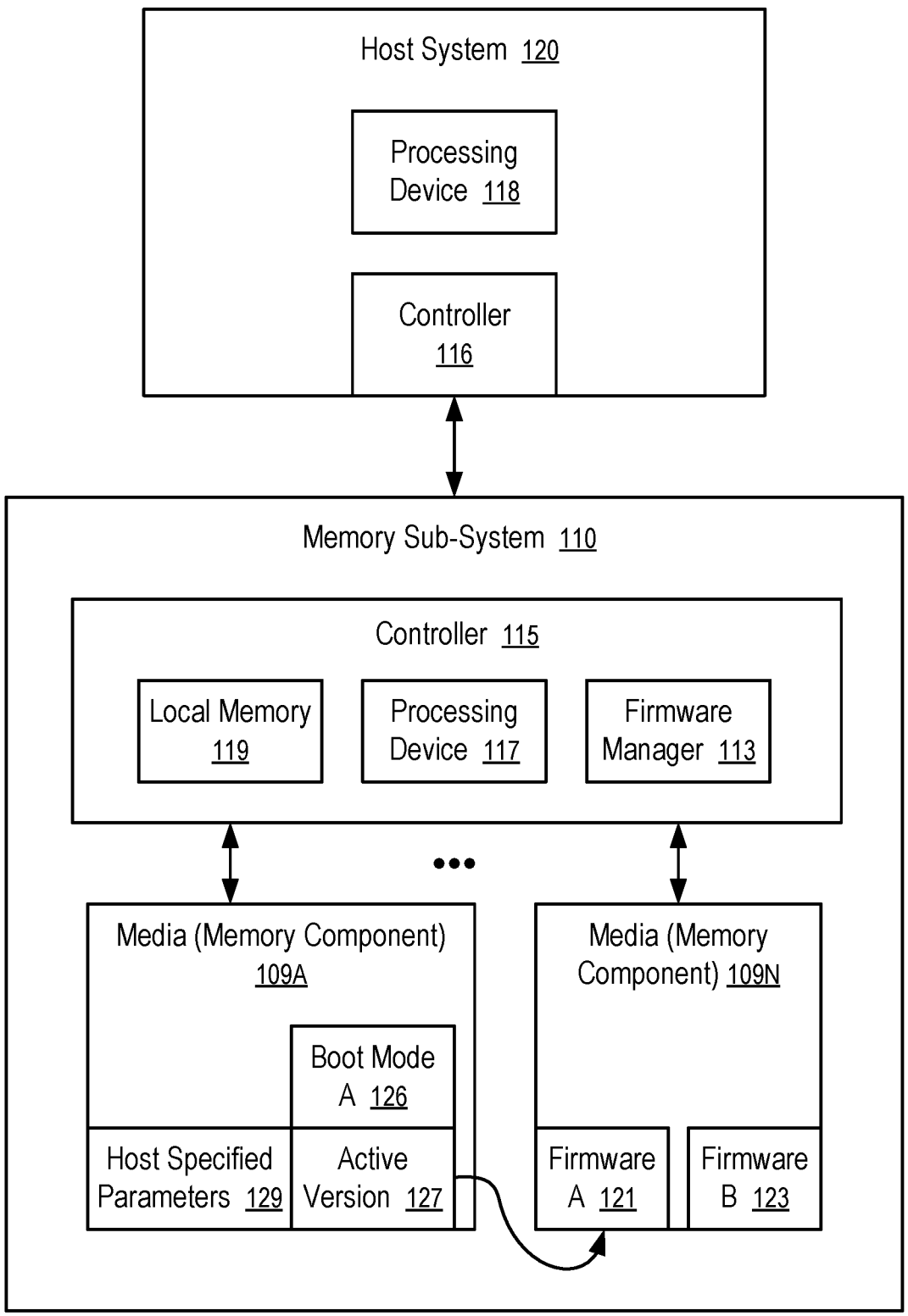
FIGS. 2 and 3 show a computing system having a firmware manager that activates new firmware in accordance with at least some embodiments disclosed herein.
Figure 3:
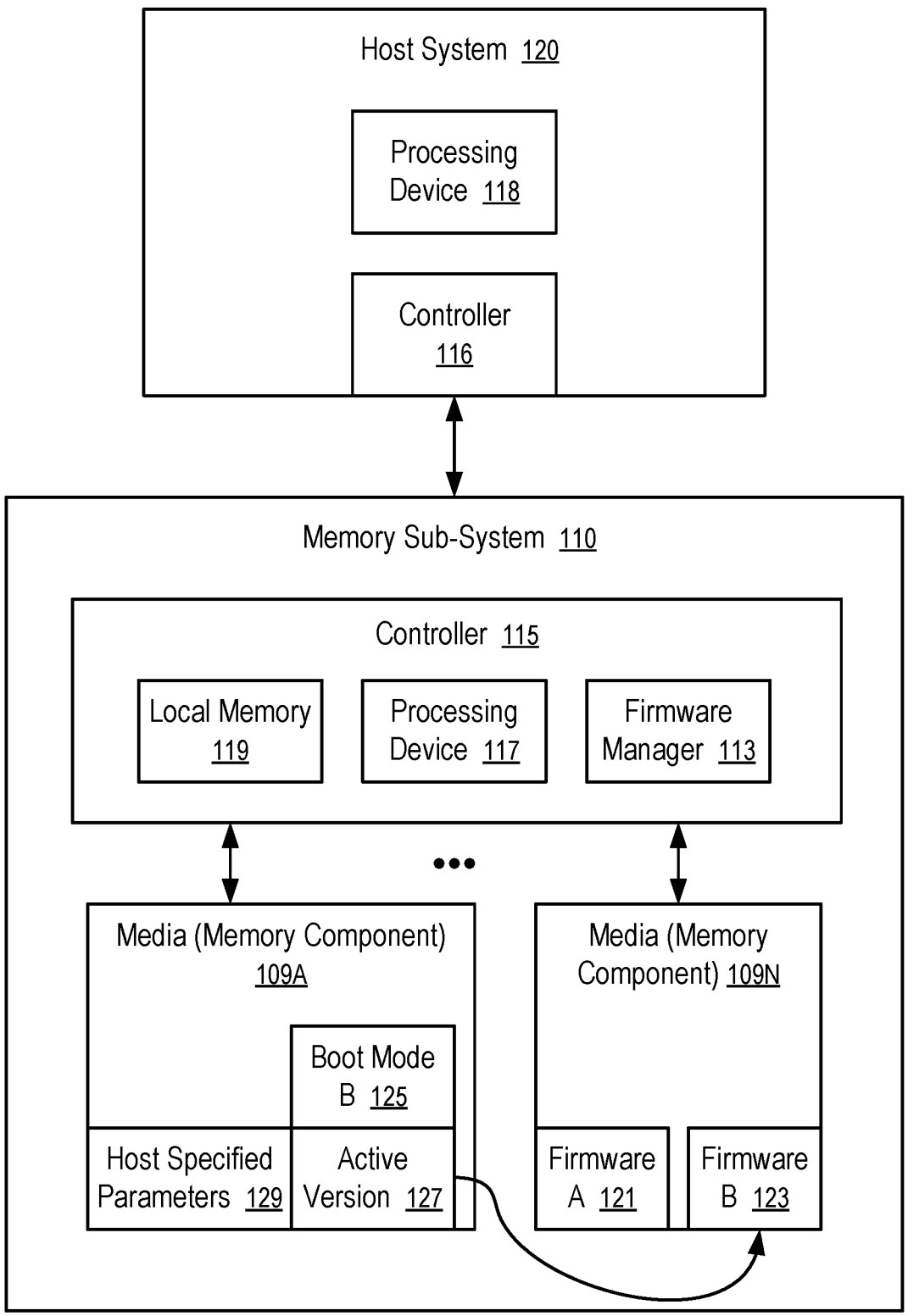

FIGS. 2 and 3 show a computing system having a firmware manager 113 that activates new firmware in accordance with at least some embodiments disclosed herein.

In FIG. 2, the memory sub-system 110 can initially run firmware 121 to operate with the host system 120.

The firmware manager 113 can store an active version indicator 127 that identifies the firmware 121 as being active such that when the memory sub-system 110 is restarted, reset, rebooted, or started when being powered on, the controller 115 runs the firmware 121 identified by the active version indicator 127.

To work properly with the host system 120, the memory sub-system 110 uses a set of host specified parameters 129. Some of the parameters are typically obtained from the host system 120 during a power-up device configuration process in which the parameters are dynamically determined based on the presence of devices in the computer system. For example, a set of registers can be used to store such parameters that control the operations of the memory sub-system 110 and/or control the communications of the memory sub-system 110 with the host system 120.

For example, the content of base address registers of the memory sub-system 110 can be set up during the power up configuration phase of the computer system, such as BIOS (Basic Input/Output System) setup. The base addresses in the registers can be used to perform the mapping between the memory addresses used in the host system 120 and the addresses used in the memory sub-system 110.

For example, the host system 120 can communicate commands/requests to the memory sub-systems 110 by placing the commands/requests in message queues. The parameters for the memory sub-system 110 to access the message queues can be specified during the boot up process and/or via additional commands transmitted via the message queues.

For example, the host system 120 can communicate with the memory sub-system 110 in accordance with a version of NVMe (e.g., Non-Volatile Memory Host Controller Interface Specification 1.2) that specifies the use of a circular buffer with a fixed slot size for a submission queue or a completion queue.

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from a NVMe device (e.g., memory sub-system 110), commands to write data into the NVMe device, commands to compare data in the NVMe device, etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the NVMe device fetch the commands/requests from a submission queue according to the order in which the commands are placed in the submission queue. However, the NVMe allows the controller 115 of the NVMe device to execute the fetched commands in any order.

The firmware manager 113 stores in the host specified parameters 129 in a reserved area in the memory sub-system 110 where the stored data is retained after the firmware manager 113 instructs the controller 115 to restart.

For example, the memory sub-system 110 has a memory component 109A that has a non-volatile memory that can retain the stored data after the controller 115 cycles its power to restart. For example, the firmware manager 113 can instruct a power management circuit of the memory sub-system 110 to momentarily turn off power to the controller 115 and/or other components of the memory sub-system 110 and turn on power again to restart the memory sub-system 110.

Alternatively, the memory component 109A has a volatile memory that is used to store the host specified parameters 129. However, the firmware manager 113 can restart the memory sub-system 110 in a mode that does not power cycle the volatile memory of the memory component 109A. Thus, after restarting the memory sub-system 110 in such a mode, the host specified parameters 129 are retained and can be used without a need to communicate with the host system 120 to re-obtain the parameters 129.

In some instances, the host specified parameters 129 can be stored in place in the registers that are not power cycled in the restart mode to avoid the need to re-configured the registers. Alternatively, the firmware manager 113 retrieves the host specified parameters 129 from the memory component 109A and configures the registers using the retrieved parameters 129.

The firmware manager 113 can store a boot mode indicator 126 to instruct the firmware 123 to configure the registers in accordance with the mode identified by the boot mode indicator 126.

When the boot mode indicator 126 requires a normal boot process, the memory sub-system 110 running the firmware 121 (or a different firmware 123) is configured to communicate with the host system 120 to obtain the host specified parameters 129. The host system 120 can be required to be in a boot process to provide at least some of the host specified parameters 129.

When the boot mode indicator 126 is changed to a boot mode indicator 125 that requires a restart process, the memory sub-system 110 running the firmware 121 (or a different firmware 123) is configured to skip communications with the host system 120 that are designed to obtain the host specified parameters 129. Instead, the memory sub-system 110 retrieves the host specified parameter 129 from the memory component 109A and use the retrieved parameter 129 to configure the memory sub-system 110, such as the registers of the memory sub-system 110. In implementations where the registers of the memory sub-system 110 have the capability of retaining their data during the restart process, the memory sub-system 110 can skip the operations of configuring the registers. Optionally, the firmware manager 113 can compare the data in the registers with the host specified parameters 129 stored in the memory component to detect any errors during the restart process. Thus, even though the host system 120 is required to be in a boot process to initially provide some of the specified parameters 129, the firmware manager 113 can restart the memory sub-system 110 without requiring the host system 120 to enter a boot process. Such a restart capability can be used to perform live firmware update and activation.

For example, after storing the firmware 123 in the memory component 109N while the memory sub-system 110 is running the firmware 121, the firmware manager 113 can change the active version indicator 127 to identify the firmware 123 as the active version, as illustrated in FIG. 3. The firmware manager 113 further changes from the boot mode indicator 126 that requires a normal boot process, to the boot mode indicator 125 that requires a restart process, as illustrated in FIG. 3. Then, the firmware manager 113 instructs the memory sub-system 110 to restart, reset or reboot, which can include cycling of the power to the controller 115. Since the boot mode indicator 125 requires a restart process, the memory sub-system 110 uses the stored host specified parameters 129 without engaging communications with the host system 120 to re-obtain the parameters 129. Since the active version indicator 127 identifies the firmware 123 as the active firmware, the controller 115 loads and runs the firmware 123. Thus, the firmware 123 is activated and used, with reduced impact on the host system 120.

Preferable, before the firmware manager 113 initiates restarting of the memory sub-system 110, the memory sub-system 110 running the firmware 121 completes the commands/requests that have retrieved from the message queues in the host system 120, without retrieving further new commands/requests from the message queues. When there is no pending command/request in the memory sub-system 110, the memory sub-system 110 restarts to run firmware 123, in accordance with the active version indicator 127. After restarting of the memory sub-system 110, the memory sub-system 110 running the firmware 123 can use the host specified parameters 129 to retrieve further commands from the message queues. Thus, the impact of the live firmware activation on the host system is substantially limited to the lack of capability of the memory sub-system 110 in processing commands/requests in the message queue for the duration of the restarting/rebooting of the memory sub-system 110. Thus, the performance of the computing system 100 as a whole is improved.

FIGS. 2 and 3 illustrate an example in which the firmware 121 and 123 are stored in a memory component 109N that is separate from the memory component 109A storing the host specified parameters 129, the boot mode indicator 126, and/or the active version indicator 127. In general, the firmware 121 and 123, the host specified parameters 129, the boot mode indicator 126, and/or the active version indicator 127 can be stored in a same memory component 109A or 109N, or in two or more separate memory components 109A to 109N.

In some implementations, the firmware manager 113 can be part of the firmware 121 and/or the firmware 123. When the controller 115 runs the firmware 121 or 123 to start or boot up the memory sub-system 110, the memory sub-system 110 automatically determines whether the host system 120 is rebooting or restarting and/or whether the memory component 109A stores a valid copy of host specified parameters 129. For example, the validity of the host specified parameters 129 can be determined based on a timestamp of the host specified parameters 129 and/or based on a comparison between the host specified parameters 129 in the memory component and the corresponding data in registers. If the memory sub-system 110 has valid host specified parameters 129 and the host system 120 is not in the process of rebooting, the firmware manager 113 can automatically configure the memory sub-system 110 using the valid parameters 129 and skip communicating with the host system 120 to obtain the parameters 129; otherwise, the memory sub-system 110 can request the host system 120 to provide the parameters and/or requests the host system 120 to restart, reset, or reboot.

Figure 4:
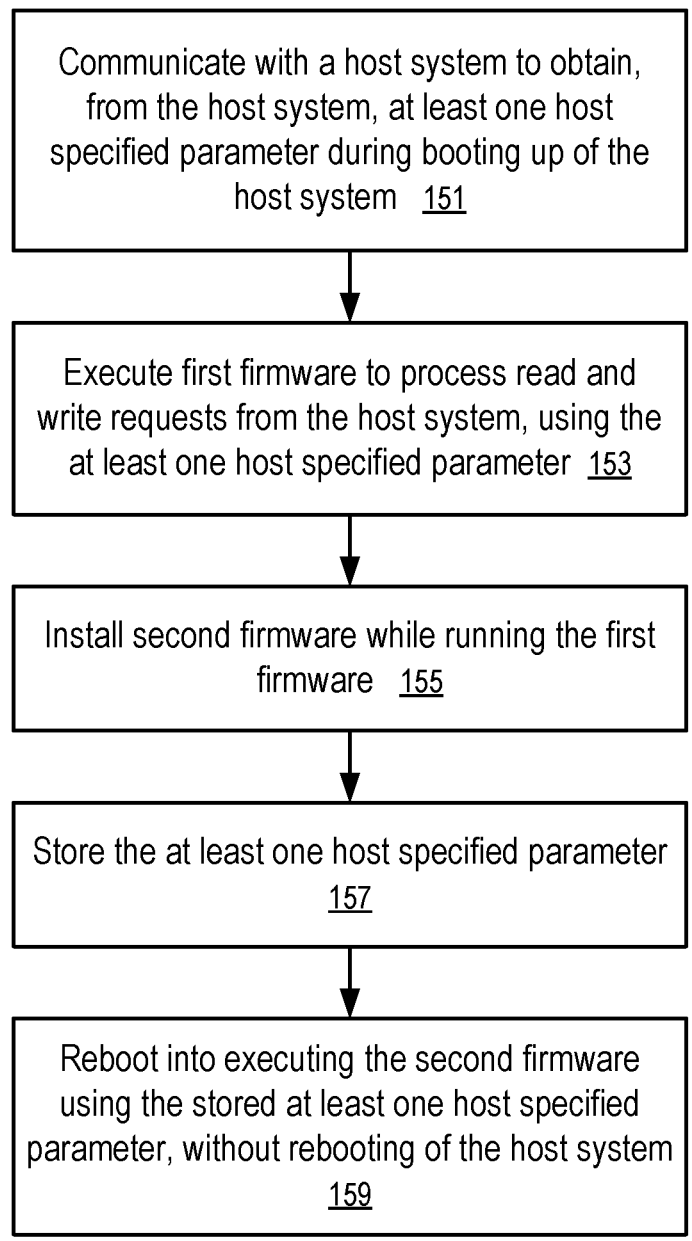
FIGS. 4 and 5 show methods to perform firmware activation.
Figure 5:
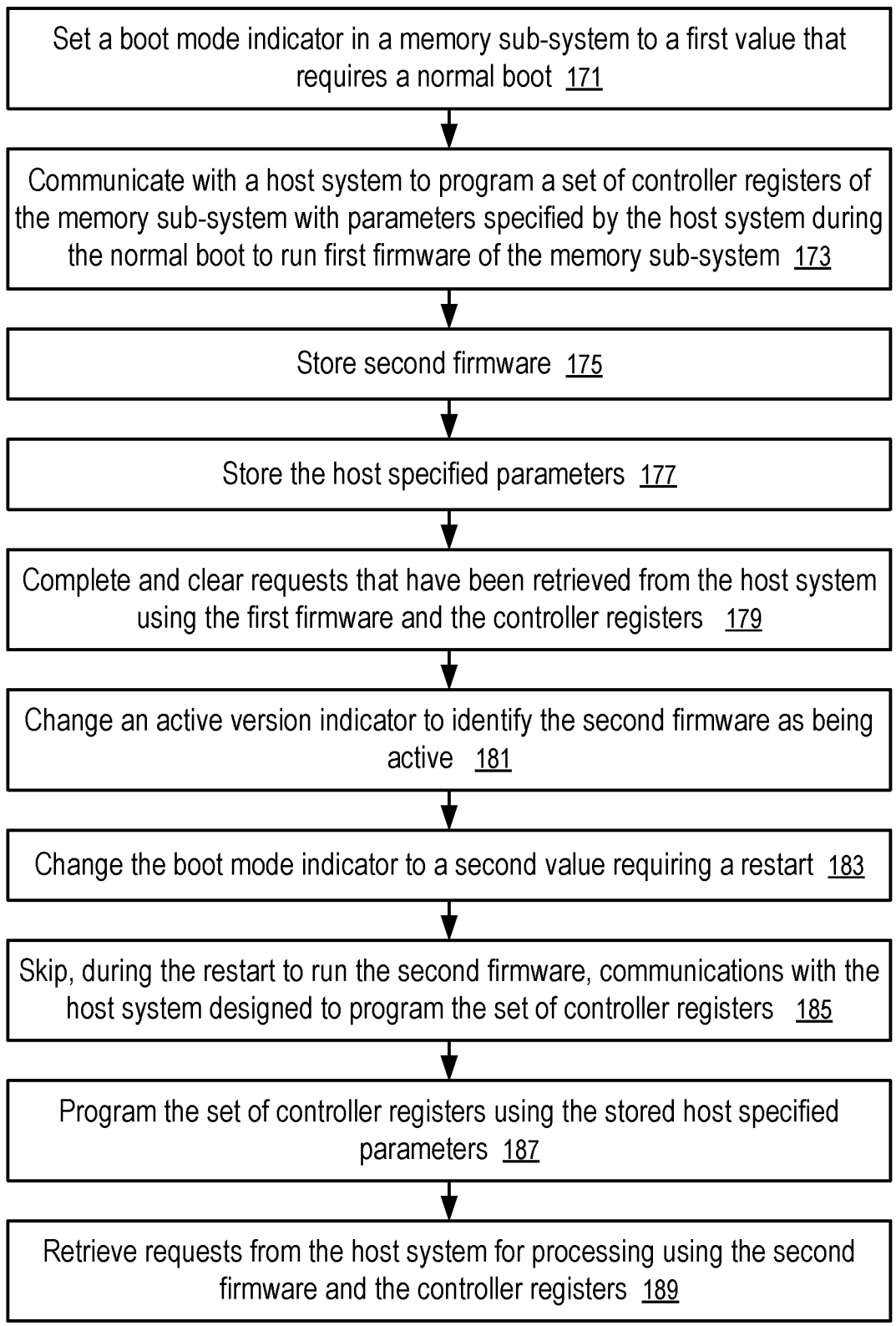

FIGS. 4 and 5 show methods to perform firmware activation. The method of FIG. 4 or 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 or 5 is performed at least in part by the firmware manager 113 of FIG. 1 or FIGS. 2 and 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 151 of FIG. 4, the controller 115 of the memory sub-system 110 communicates with the host system 120 to obtain, from the host system 120, at least one host specified parameter 129 during booting up of the host system 120.

For example, such a host specified parameter 129 can be a base address for mapping memory addresses in the host and addresses in the memory system (e.g., the content of a base address register). For example, such a host specified parameter 129 can be attributes of message queues used by the memory system to retrieve messages from the host system (e.g., the content of a register for admin queue attributes). For example, such a host specified parameter 129 can be a portion of the content of NVMe controller registers. Such a host specified parameter 129 typically controls at least the processing of some of the requests or commands from the host system 120.

At block 153, the controller 115 executes first firmware 121 to process read and write requests from the host system, using the at least one host specified parameter 129.

At block 155, the firmware manager 113 installs second firmware 123 while running the first firmware 121.

At block 157, the firmware manager 113 stores the at least one host specified parameter 129.

At block 159, the firmware manager 113 causes the memory sub-system 110 to reboot such that after rebooting, the memory sub-system 110 executes the second firmware 123 using the stored at least one host specified parameter 129. The rebooting of the memory sub-system 110 is performed without rebooting of the host system 120.

In general, the host system 120 can specify further parameters for the memory sub-system 110 after the booting process of the host system 120 is completed. Such further parameters can be independent of any specific request/command, and can be used in the processing of at least some types of requests/commands from the host system 120. Thus, it can be advantageous to store such parameters before the rebooting 159 of the memory sub-system 110 to avoid the need to request, obtain, communicate such parameters after a restart and thus to reduce the impact of firmware activation on the host system 120. Further, the memory sub-system 110 can optionally store requests/commands that have received/retrieved from the host system 120 and buffered in the memory sub-system 110, pending for execution. After the rebooting 159 of the memory sub-system 110 to run the second firmware 123, the controller 115 can restore the pending requests/commands to its buffer(s) for execution under the control by the second firmware 123. Alternatively, the controller 115 can stop retrieving new commands/requests from the host system 120, complete any pending commands/requests before the reboot 159. Such an arrangement can eliminate the need to store the pending commands/requests before the rebooting 159 and the need to restore the pending commands/requests after the rebooting 159 and thus improve the overall performance of the computing system 100.

At block 171 of FIG. 5, the firmware manager 113 sets a boot mode indicator in the memory sub-system 110 to a first value (e.g., 126) that requires a normal boot.

At block 173, the controller 115 of the memory sub-system 110 communicates with the host system 120 to program a set of controller registers (e.g., local memory 119) of the memory sub-system 110 with parameters specified by the host system 120 during the normal boot to run first firmware 121 of the memory sub-system 110.

For example, the registers can include a base address register and/or a register for admin queue attributes. The register for admin queue attributes can specify a location of an admin message queue in the host system; and the base address register can specify a mapping between the memory addresses used by the host system 120 and addresses in the memory sub-system 110.

At block 175, the firmware manager 113 stores second firmware 123 while the controller 115 is running the first firmware 121.

At block 177, the firmware manager 113 stores the host specified parameters 129.

In some instances, the host specified parameters 129 are stored in the non-volatile memory of a memory component 109A such that the host specified parameters 129 can be preserved after a reset operation to restart or reboot the memory sub-system 110.

In some instances, the host specified parameters 129 are stored in volatile memory of the memory sub-system 110 (e.g., in local memory) where the volatile memory is preserved when a reset operation is performed to restart or reboot the memory sub-system 110 in a restart mode.

In some instances, the host specified parameters 129 are preserved in place in the controller registers where the content in the controller registers are not erased or changed when a reset operation is performed to restart or reboot the memory sub-system 110 in a restart mode identified by the boot mode indicator 125. When the boot mode indicator 126 requires a normal boot, the content of the controller registers can be erased or cleared.

The firmware manager 113 can further store other host specified parameters that can be programmed after the boot up of the computer system 100. For example, a controller register for an input/output (I/O) message queue can be programmed using commands/requests sent using an admin message queue during normal operations of the memory sub-system 110 running the first firmware 121.

At block 179, the controller 115 of the memory sub-system 110 complete and clears any pending requests that have been retrieved from the host system using the first firmware 121 and the controller registers.

Alternatively, the pending requests can be stored and restored after reset for execution by the second firmware 123.

At block 181, the firmware manager 113 changes an active version indicator 127 to identify the second firmware 123 as being active.

At block 183, the firmware manager 113 changes the boot mode indicator to a second value (e.g., 126) requiring a restart.

At block 185, the controller 115 skips communications with the host system 120 during the restart to run the second firmware 123, where the communications are designed to program the set of controller registers.

At block 187, the firmware manager 113 programs the set of controller registers using the stored host specified parameters.

For example, the firmware manager 113 can retrieve the host specified parameters 129 from the memory component 109A and used the retrieved parameters to set the controller registers.

For example, during the restart of the memory sub-system according to the second value (e.g., 126) of the boot mode indicator, the controller 115 and/or the processing device 117 is powered off and then powered up.

For example, in response to an internal reset according to the second value (e.g., 126) of the boot mode indicator, the content of the controller registers is preserved and is not cleared/erased.

For example, an internal reset to reboot or restart the memory sub-system 110 to run the active firmware 123 can erase or clear the controller registers; however, the firmware manager 113 can retrieve the host specified parameters 129 from the memory component 109A to program the controller registers.

Thus, the controller registers can be programmed without communicating to the host system 120 during the firmware update and/or activation.

At block 189, the controller 115 retrieves requests from the host system 120 for processing using the second firmware 123 and the controller registers. The memory sub-system 110 processes the requests by executing the second firmware 123.

In some implementations, a communication channel between the host system 120 and the memory sub-system 110 can include a computer bus and/or a computer network, such as a local area network, a wireless local area network, a wireless personal area network, a cellular communications network, a broadband high-speed always-connected wireless communication connection (e.g., a current or future generation of mobile network link). The host system 120 and the memory sub-system 110 can be configured to communicate with each other using data storage management and usage commands similar to those in NVMe protocol.

Firmware in general is a type of computer program that provides control, monitoring and data manipulation of engineered computing devices.

Some embodiments involving the operation of the firmware manager 113 can be implemented using computer instructions executed by the controller 115, such as the firmware 121 and 123 of the controller 115. In some instances, hardware circuits can be used to implement at least some of the functions. The firmware can be initially stored in the non-volatile storage media, or another non-volatile device, and loaded into the volatile DRAM and/or the in-processor cache memory for execution by the controller 115.

A non-transitory computer storage medium can be used to store instructions of the firmware of a memory sub-system 110. When the instructions are executed by the controller 115 and/or the processing device 117, the instructions cause the controller 115 and/or the processing device 117 to perform a method discussed above.

Figure 6:
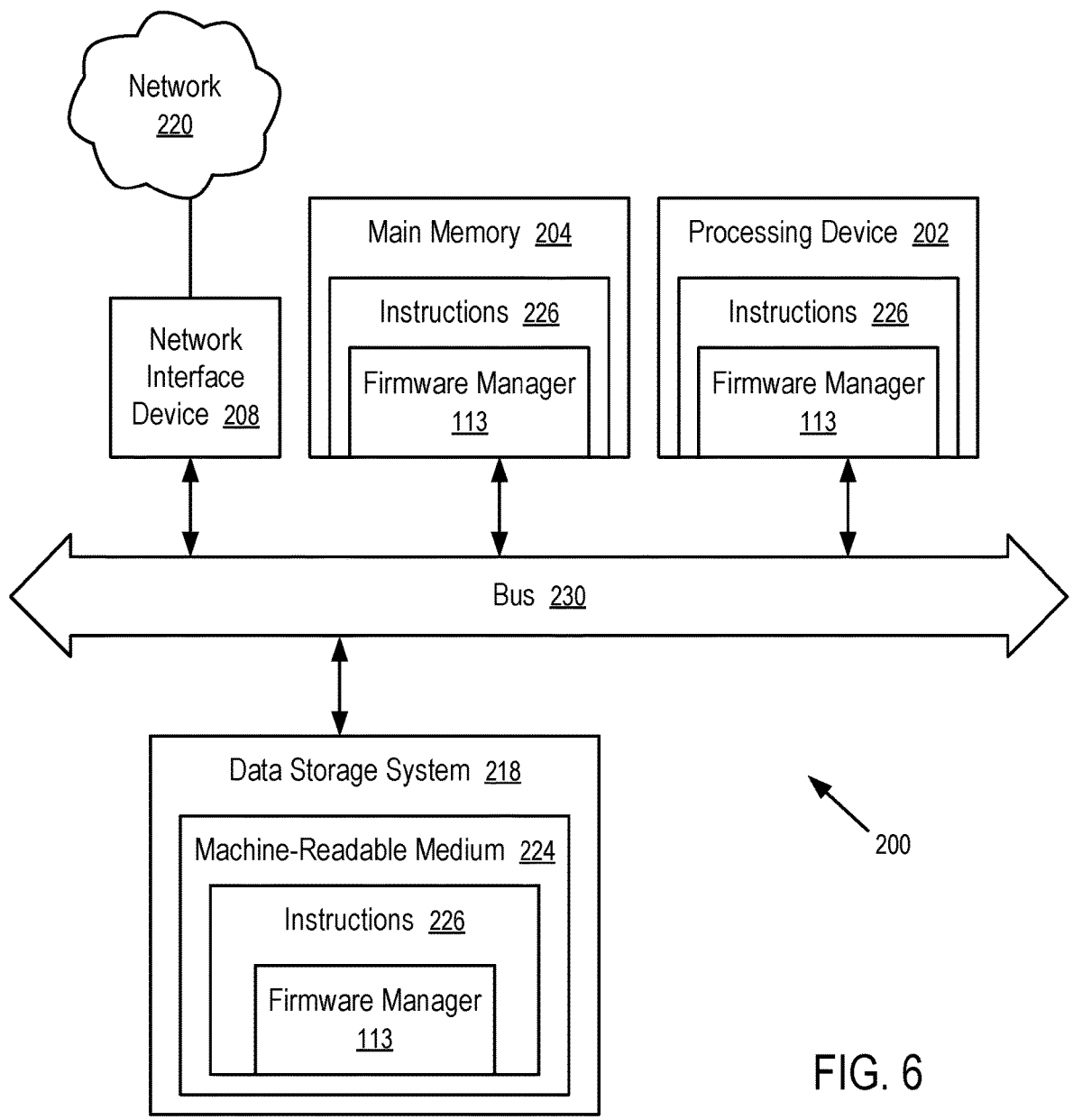
FIG. 6 is a block diagram of an example computer system in which embodiments of the present disclosure can operate.

FIG. 6 illustrates an example machine of a computer system 200 within which a set of instructions, for causing the machine to perform any one or more of the methodologies discussed herein, can be executed. In some embodiments, the computer system 200 can correspond to a host system (e.g., the host system 120 of FIG. 1) that includes, is coupled to, or utilizes a memory sub-system (e.g., the memory sub-system 110 of FIG. 1) or can be used to perform the operations of a firmware manager 113 (e.g., to execute instructions to perform operations corresponding to the firmware manager 113 described with reference to FIGS. 1-5). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit (CPU), or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), a graphics processing unit (GPU), a network processor, or the like. The processing device 202 is configured to execute instructions 226 for performing the operations and steps discussed herein. The computer system 200 can further include a network interface device 208 to communicate over the network 220.

The data storage system 218 can include a machine-readable storage medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable storage medium 224, data storage system 218, and/or main memory 204 can correspond to the memory sub-system 110 of FIG. 1.

In one embodiment, the instructions 226 include instructions to implement functionality corresponding to a firmware manager 113 (e.g., the firmware manager 113 described with reference to FIGS. 1-5). While the machine-readable storage medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   obtaining, by a memory system from a host system, at least one host specified parameter;
   executing, in the memory system, first firmware to process requests from the host system using the at least one host specified parameter;
   installing second firmware in the memory system while running the first firmware;
   storing the at least one host specified parameter and a boot mode indicator; and rebooting into executing the second firmware using the at least one host specified parameter by skipping, in accordance with the boot mode indicator, communication with the host system to obtain the at least one host specified parameter.

2. The method of claim 1, further comprising:
storing, in at least one controller register of the memory system, the at least one host specified parameters during booting up of the host system; and
resetting the memory system to start the rebooting without resetting the at least one controller register.

3. The method of claim 1, further comprising:
storing, in at least one controller register of the memory system, the at least one host specified parameters during booting up of the host system;
resetting the memory system to start the rebooting, including resetting the at least one controller register; and
storing, in the at least one controller register, the at least one host specified parameters by reading the at least one host specified parameters from a non-volatile memory of the memory system.

4. The method of claim 1, further comprising:
storing, in at least one controller register of the memory system, the at least one host specified parameters during booting up of the host system;
changing the boot mode indicator from a normal mode to a restart mode;
resetting the memory system to start the rebooting when the boot mode indicator identifies the restart mode; and
skipping communication with the host system to obtain the at least one host specified parameters based on the boot mode indicator identifying the restart mode.

5. The method of claim 1, wherein the host specified parameter is one of:
a base address for mapping memory addresses in the host system and addresses in the memory system; and
attributes of message queues used by the memory system to retrieve messages from the host system.

6. A memory system, comprising:
at least one memory device; and
a processing device coupled with the at least one memory device and configured to:
obtain, from a host system, at least one host specified parameter during booting up of the host system;
execute, in the memory system, first firmware to process requests from the host system using the at least one host specified parameter;
install second firmware in the memory system while running the first firmware;
store the at least one host specified parameter and a boot mode indicator; and
reboot into executing the second firmware using the at least one host specified parameter by skipping, in accordance with the boot mode indicator, communication with the host system to obtain the at least one host specified parameter.

7. The memory system of claim 6, wherein the processing device is further configured to:
store a first value of the boot mode indicator in the memory system before rebooting into executing the second firmware, wherein based on the first value of the boot mode indicator, the memory system skips the communication with the host system to obtain the at least one host specified parameter.

8. The memory system of claim 7, further comprising:
a register configured to store a base address, wherein the host specified parameter includes the base address.

9. The memory system of claim 7, wherein the host specified parameter identifies a location of a message queue in the host system; and the processing device is configured to retrieve requests from the host system from the message queue.

10. The memory system of claim 7, further comprising:
a controller register, wherein during the rebooting into executing the second firmware, the memory system is configured to read, based on the first value of the boot mode indicator, the host specified parameter from a memory device of the memory system and set the host specified parameter in the controller register, without the communication with the host system to obtain the host specified parameter.

11. The memory system of claim 10, configured to clear the controller register during a reset to start the rebooting into executing the second firmware.

12. The memory system of claim 11, configured to power off and then power up the processing device during the reset.

13. The memory system of claim 12, wherein a memory device of the memory system used to store the at least one host specified parameter is non-volatile.

14. The memory system of claim 7, further comprising:
a controller register configured to store the host specified parameter during the booting up of the host system.

15. The memory system of claim 14, wherein during a reset to start the rebooting into executing the second firmware, the controller register is not cleared in accordance with the first value of the boot mode indicator.

16. The memory system of claim 14, wherein during a reset to start the rebooting into executing the second firmware, the controller register is cleared; and
during the rebooting into executing the second firmware, the memory system is configured, based on the first value of the boot mode indicator, to read the host specified parameter from a memory device of the memory system and set the host specified parameter in the controller register, without the communication with the host system to obtain the host specified parameter.

17. The memory system of claim 16, wherein when a second value of the boot mode indicator is stored in the memory system, the memory system is configured, based on the second value of the boot mode indicator, to communicate with the host system to obtain the host specified parameter during booting up of the memory system.

18. The memory system of claim 6, wherein the processing device is further to:
store both the first firmware and the second firmware; and
store an indicator identifying the second firmware as being active before rebooting into executing the second firmware.

19. A non-transitory computer storage medium storing instructions which, when executed in a memory system, cause the memory system to perform a method comprising:
obtaining, by the memory system from a host system, at least one host specified parameter;
executing, in the memory system, first firmware to process requests from the host system using the at least one host specified parameter;
installing second firmware in the memory system while running the first firmware;
storing the at least one host specified parameter and a boot mode indicator; and rebooting into executing the second firmware using the at least one host specified parameter by skipping, in accordance with the boot mode indicator, communication with the host system to obtain the at least one host specified parameter.

20. The non-transitory computer storage medium of claim 19, wherein the method further comprises:
receiving first requests from message queues on the host system, wherein the message queues are specified using the at least one host specified parameters;
processing the first requests by executing the first firmware;
receiving, after rebooting into executing the second firmware, second requests of the host system using the message queues specified using the at least one host specified parameters; and
processing the second requests by executing the second firmware.

* * * * *